United States Patent Office
3,810,925
Patented May 14, 1974

3,810,925
STABILIZED HEAT CURABLE SILICONE
ELASTOMERS
George Juris Viksne, Adrian, Mich., assignor to Stauffer
Chemical Company, Westport, Conn.
No Drawing. Filed Jan. 2, 1973, Ser. No. 319,952
Int. Cl. C08g 51/04
U.S. Cl. 260—37 SB                                       12 Claims

ABSTRACT OF THE DISCLOSURE

Silicone elastomers having improved heat stability, compression set and resistance to reversion may be obtained by incorporating metal stannates in heat curable organopolysiloxane compositions.

The present invention relates to heat curable silicone elastomers, particularly heat curable silicone elastomers having improved heat stability. More particularly, it relates to heat curable silicone elastomers which have improved compression set and improved resistance to reversion.

Silicone elastomers are generally stable at temperatures below about 150° C. and may be used at temperatures up to about 260° C. and even up to 315° C. for short periods of time. When these same silicone elastomers are used at temperatures above about 200° C. for extended periods of time, they have a tendency to deteriorate rapidly. Since silicone elastomers are generally used at elevated temperatures in many of their applications, deterioration is a highly undesirable property.

While red iron oxide has been incorporated in heat curable organopolysiloxane compositions to improve the heat-age resistance of these compositions, it has a vivid red color and must be incorporated into the organopolysiloxane compositions in relatively large amounts to be an effective heat-age additive. As a result its red color is imparted to the final cured rubber composition, rendering its unsuitable for many purposes.

It has been discovered that certain inorganic stannates and mixtures thereof may be incorporated into heat curable organopolysiloxane compositions to provide rubber compositions having markedly improved color characteristics which may be easily pigmented while producing rubber compositions having superior resistance to steam, heat aging and reversion.

Therefore, it is an object of this invention to provide heat curable silicone elastomers having improved physical properties. Another object of this invention is to provide heat curable silicone elastomers having improved heat stability. Still another object of this invention is to provide heat curable silicone elastomers having improved compression set. A further object of this invention is to provide silicone elastomers having improved resistance to embrittlement when heat aged. A still further object of this invention is to provide a method for improving the heat stability of heat curable silicone elastomers. Yet a still further object of this invention is to improve the resistance of silicone elastomers to enclosed reversion.

The foregoing objects and others which will become apparent from the following description are accomplished in accordance with this invention, generally speaking, by incorporating metal stannates in heat curable organopolysiloxane compositions. The compositions when vulcanized at elevated temperatures will exhibit improved heat stability, improved compression set, and improved resistance to enclosed reversion. The addition of the stannates is of special value in connection with silicone elastomers which are heat-aged and are thus subject to degradation and reversion during heat-aging.

The silicone elastomers of this invention are prepared in the conventional manner, namely by curing at elevated temperatures heat curable organopolysiloxanes containing the stannates, vulcanizing agents, fillers and if desired, additional reinforcing and nonreinforcing fillers. The compositions when properly cured, will provide silicone elastomers having improved heat resistance and improved compression set. While the presence of the stannates in these compositions will improve the physical properties of the silicone elastomers, its effectiveness is not contingent upon the type of organopolysiloxane or vulcanizing agent employed. The organopolysiloxanes useful in the invention are commonly referred to as dialkyl or alkylaryl polysiloxane gums. These organopolysiloxanes are well known in the art and methods for producing such materials are old and widely described in the literature. The curable organopolysiloxanes have a Williams plasticity range of from 50 to 250 millimeters and have recurring structural units of the general formula:

where $n$ is a number of from about 1.9 to 2.2 and R represents monovalent hydrocarbon radicals, such as alkyl, aryl, aralkyl, alkaryl, alkenyl, halogenated and cyano-substituted aryl radicals. It is also desirable that in the curabe organopolysiloxanes the majority of the R radicals be lower alkyl radicals, for example, methyl radicals. It is usually preferred that the organopolysiloxanes from which the curable compositions are prepared contain an average of from about 1.98 to about 2.2 organic groups, for instance, methyl groups or methyl phenyl groups, etc., per silicon atom and that more than 98 percent of the silicon atoms of the polysiloxane contain two silicon bonded organic groups, for instance, alkyl groups or a mixture of alkyl and aryl groups, etc., per silicon atom. Included specifically in this formula are the dimethylpolysiloxanes, methylphenylpolysiloxanes, methylvinylpolysiloxanes and copolymers of such units, such as copolymers containing dimethyl-, diphenyl-, and phenylmethylsiloxane units and copolymers containing phenylmethyl-, dimethyl- and vinylmethylsiloxane units.

Various antistructuring agents may be incorporated in the compositions of this invention to prevent hardening or "crepe aging" of the materials prior to vulcanization. Examples of suitable antistructuring agents are water; hydroxyl-terminated silanes and siloxanes having a viscosity of from about 30 to 100 centistokes, such as diphenylsilane diols, methylphenylsilane diols, hydroxylated methylpolysiloxanes, hydroxylated methylphenylpolysiloxanes, hydroxylated diphenylpolysiloxanes; methyl endblocked dimethylpolysiloxane fluids; low molecular weight alkoxylated siloxanes; phosphate fluids, such as tripropylphosphate and tributylphosphate; glycols, such as ethylene glycol and propylene glycol; esters; and anhydrides, such as phthalic anhydride.

The amount of antistructuring agents in these compositions generally ranges from about 2 to 30 percent, preferably from about 5 to 20 percent by weight based on the weight of the organopolysiloxane polymers.

Stannates which have been found to be operable as heat-age additives in the present invention include rare earth stannates such as cerium, lanthanum, neodymium, praseodymium, samarium, gadolinium, yttrium, thorium and mixtures thereof. Other metal stannates which impart improved properties to the heat curable organopolysiloxane compositions are stannates of Group II metals of the Periodic Table, such as calcium, barium, magnesium, strontium, cadmium, etc. and stannates of Group VIII metals such as cobalt, nickel, iron and the like.

The amount of metal stannates necessary for imparting desirable properties to the cured silicone elastomers may be varied within wide limits. On a weight basis, amounts as low as 0.1 percent of metal stannate based on the organopolysiloxane polymer will be found to exert an improvement in the properties. Generally amounts ranging from 0.1 to 10 percent, more preferably from about 1 to 7 percent by weight based on the weight of the organopolysiloxane polymers is sufficient for imparting desired properties to the cured silicone elastomers.

Finely divided fillers, such as reinforcing and nonreinforcing fillers may be incorporated in the curable organopolysiloxane compositions. The amount of fillers used in combination with the organopolysiloxane polymers may be varied within wide limits, for instance, from 10 to 300 percent by weight of fillers based on the weight of the organopolysiloxane polymers. The exact amount of fillers used will depend upon such factors as for instance, the application for which the curable organopolysiloxane compositions are intended, the type of fillers employed, e.g., the density of the fillers, the type of curable organopolysiloxanes employed, etc. Obviously, mixtures of reinforcing fillers with nonreinforcing fillers may be employed.

Examples of suitable fillers which may be used are asbestos, clay, hydrated calcium silicate, zinc sulfide, silica aerogel, barium titanate, glass fiber, floc, iron oxide, bentonite, zinc oxide, nickelous oxide, magnesium oxide, micronized graphite, micronized slate, micronized mica, celite, lead dioxide, lead oxide, blue lead, alumina, either hydrated or dehydrated, titanium dioxide and calcium carbonate.

Various curing agents may be added to the organopolysiloxane compositions to effect rapid conversion of the compositions to an elastomeric state. Among such curing agents may be mentioned, for example, benzoyl peroxide, t-butyl perbenzoate, bis(2,4-dichlorobenzoyl) peroxide, dicumyl peroxide, dialkyl peroxides, such as di-t-butyl peroxide, etc. These curing agents may be present in amounts ranging from about 0.1 to as high as 4 to 8 percent by weight or even more based on the weight of the organopolysiloxane polymers.

The manner in which the present invention may be practiced may be widely varied. Although the stannates may be incorporated in the curable organopolysiloxane polymers before the addition of the reinforcing fillers, it may be incorporated simultaneously with the other fillers. Preferably, however, the stannates are added to the organopolysiloxane polymers prior to milling. Curing agents and other additives such as dyes, pigments and flame retardants, may be added to the organopolysiloxane compositions during the milling operation.

Alternatively, the stannates may be added to the organopolysiloxane compositions and then milled with the reinforcing and nonreinforcing fillers at some future time.

When the organopolysiloxane compositions are molded, they are heated to temperatures of from 100° to 200° C. for varying periods of time, for instance, from about 5 to 30 minutes or more. Molding pressures ranging from about 10 to 1,000 p.s.i. or more are advantageously used. The molded product is preferably given a post-cure treatment at elevated temperatures, for example, from about 1 to 24 hours or more and at temperatures of from 150° to 250° C. to bring out the optimum properties of the cured silicone elastomers.

The silicone elastomers of this invention containing at least 1 percent and preferably not more than 10 percent of stannate based on the weight of the organopolysiloxane polymers exhibit improved heat stability and improved compression set over conventional silicone elastomers and/or silicone elastomers filled with other heat stable compositions.

The silicone elastomers of this invention are capable of withstanding elevated temperatures of from 150° to over 300° C. for extended periods of time and retain their desirable properties. Such a range of properties makes them highly useful as insulating materials for electrical conductors and for the production of commercial items such as tubing, hoses, sheeting, gaskets and the like.

The embodiments of this invention are further illustrated by the following examples in which all parts are by weight unless otherwise specified.

EXAMPLE I

A polysiloxane gum is prepared by co-reacting octamethylcyclotetrasiloxane and tetramethyltetravinylcyclotetrasiloxane in such proportions that the gum contains about 0.2 mole percent methyl vinyl siloxanes with 0.001 percent by weight potassium hydroxide at a temperature of about 140° to 150° C. for from 4 to 5 hours. The polysiloxane gum contains an average of about 2.0 methyl groups per silicon atom.

EXAMPLE II

The organopolysiloxane gum prepared in accordance with the procedure described in Example I is utilized in the three formulations shown in Table I.

TABLE I

| Ingredients, parts | Formulation | | | |
|---|---|---|---|---|
| | A | B | C | D |
| Polysiloxane gum (Example 1) | 70 | 70 | 70 | 70 |
| OH-terminated polydimethylsiloxane (50 cs.) | 12.5 | 12.5 | 12.5 | 12.5 |
| Fumed silica (Cab-O-Sil) | 17.5 | 17.5 | 17.5 | 17.5 |
| Bis (2,4-dichlorobenzoyl) peroxide | 1.4 | 1.4 | 1.4 | 1.4 |
| Titanium dioxide (fumed) | 3.0 | | | |
| Iron oxide | | 2.0 | | |
| Cerium stannate | | | 2.0 | |

Each of the formulations shown in Table I is molded and press-cured for 5 minutes at 115° C. at a pressure of 600 p.s.i.

The physical properties of the formulations are illustrated in Table II.

TABLE II

| Physical properties | Formulation | | | |
|---|---|---|---|---|
| | A | B | C | D |
| Tensile strength, p.s.i. | 800 | 700 | 800 | 725 |
| Elongation, percent | 460 | 450 | 430 | 450 |
| Hardness, Shore A | 39 | 38 | 38 | 37 |

Each of the formulations shown in Table I is press cured for 5 minutes at 115° C. and then post-cured for about 24 hours at 249° C. in an air circulating oven. The physical properties are illustrated in Table III.

TABLE III

| Physical properties | Formulation | | | |
|---|---|---|---|---|
| | A | B | C | D |
| Tensile strength, p.s.i. | 865 | 875 | 890 | 480 |
| Elongation, percent | 380 | 410 | 375 | 130 |
| Hardness, Shore A | 43 | 39 | 39 | 50 |

Each of the formulations shown in Table I is heat-aged for 24 hours at 316° C. after post-curing at 249° C. for 24 hours in an air circulating oven. The physical properties are illustrated in Table IV.

TABLE IV

| Physical properties | Formulation | | | |
|---|---|---|---|---|
| | A | B | C | D |
| Tensile strength, p.s.i. | 500 | 555 | 415 | Brittle. |
| Elongation, percent | 205 | 250 | 170 | |
| Hardness, Shore A | 44 | 38 | 46 | |

Each of the formations shown in Table I is further for 168 hours at 249° C. after post-curing for 24 hours at 249° C. in an air circulating oven. The physical properties are illustrated in Table V.

TABLE V

| Physical properties | Formulation | | | |
|---|---|---|---|---|
| | A | B | C | D |
| Tensile strength, p.s.i. | 600 | 670 | 700 | Brittle. |
| Elongation, percent | 270 | 275 | 300 | |
| Hardness, Shore A | 43 | 40 | 45 | |

Each of the formations shown in Table I is further heat-aged at 316° C. for 168 hours after post-curing for 24 hours at 249° C. in an air circulating oven. The formulation containing cerium stannate is still flexible after heat aging.

The above tables show that cerium stannate enhances the heat stability of silicone elastomers which are subjected to temperatures above 300° C. In addition, these compositions are easily pigmented to the desired color.

EXAMPLE III

In this example, formulations are prepared composed of 100 parts of the organopolysiloxane, composition described in Example I, which contains 70 parts of polysiloxane gum, 12.5 parts of a hydroxyl-terminated polydimethylsiloxane (50 cs.) 17.5 parts of fumed silica (Cab-O-Sil, and 1.1 parts of bis(2,4-dichlorobenzoyl) peroxide. Various amounts of cerium stannate are added to these basic formulations.

These formulations are press-cured for 5 minutes at 115° C. at a pressure of 600 p.s.i., post-cured for about 24 hours at 249° C. in an air circulating oven, heat-aged for 24 hours at 316° C. in an air circulating oven and thereafter further heat-aged for 168 hours at 249° C. in an air circulating oven. The physical properties of the press-cured, post-cured and heat-aged silicone elastomers are illustrated in Table VI.

TABLE VI

| Physical properties | Cerium stannate | | | |
|---|---|---|---|---|
| | 1 part | 2 parts | 4 parts | 8 parts |
| Tensile strength, p.s.i.: | | | | |
| 5 min./115° C | 825 | 800 | 750 | 700 |
| 24 hr./249° C | 850 | 890 | 785 | 750 |
| 24 hr./316° C | 350 | 415 | 400 | 380 |
| 168 hr./249° C | 550 | 700 | 610 | 600 |
| Elongation, percent: | | | | |
| 5 min./115° C | 445 | 430 | 460 | 475 |
| 24 hr./249° C | 325 | 375 | 350 | 330 |
| 24 hr./316° C | 75 | 170 | 170 | 165 |
| 168 hr./249° C | 125 | 300 | 240 | 230 |
| Hardness, Shore A: | | | | |
| 5 min./115° C | 37 | 38 | 39 | 37 |
| 24 hr./249° C | 39 | 39 | 40 | 38 |
| 24 hr./316° C | 65 | 46 | 45 | 45 |
| 168 hr./249° C | 62 | 45 | 45 | 45 |

The above Table VI show that as little as about 1 percent by weight of cerium stannate will provide heat stability to silicone elastomers.

EXAMPLE IV

Barium stannate is mixed with an organopolysiloxane composition prepared in accordance with Example I which contains 70 parts of an organopolysiloxane gum, 12.5 parts of a hydroxyl-terminated polydimethylsiloxane (50 cs. at 25° C.), 17.5 parts of fumed silica (Cab-O-Sil) and 1.4 parts of bis (2,4-dichlorobenzoyl) peroxide. The composition is molded and press-cured for 5 minutes at 115° C. at a pressure of 600 p.s.i. and thereafter post-cured for about 24 hours at 249° C. The post-cured composition is then heat-aged at 316° C. for 24 hours in an air circulating oven. The physical properties are illustrated in Table VII.

TABLE VII

| Physical properties | Barium stannate | |
|---|---|---|
| | 2 parts | 4 parts |
| Tensile strength, p.s.i.: | | |
| Press-cured (5 min./115° C.) | 650 | 675 |
| Post-cured (24 hr./249° C.) | 590 | 500 |
| Heat-aged (24 hr./316° C.) | Flexible | Flexible |
| Elongation, percent: | | |
| Press-cured (5 min./115° C.) | 525 | 500 |
| Post-cured (24 hr./249° C.) | 270 | 280 |
| Heat-aged (24 hr./316° C.) | Flexible | Flexible |
| Hardness, Shore A: | | |
| Press-cured (5 min./115° C.) | 39 | 39 |
| Post-cured (24 hr./249° C.) | 42 | 41 |
| Heat-aged (24 hr./316° C.) | 68 | 65 |

When other organopolysiloxane polymers containing from 0.01 to 0.35 mole percent of methyl vinyl siloxane are substituted for the methylvinylpolysiloxane gum in these examples, similar results are obtained. Also, when the above examples are repeated utilizing other antistructuring agents with the other metal stannates, silicone rubbers are obtained which have excellent heat stability for extended periods of time and have improved resistance to reversion.

What is claimed is:

1. A heat curable organopolysiloxane composition containing an organopolysiloxane polymer having recurring structural units of the general formula $$R_n SiO_{\frac{4-n}{2}}$$

where R is selected from the group consisting of monovalent hydrocarbon radicals, halogenated monovalent hydrocarbon radicals and cyano-substituted aryl radicals, $n$ is a number of from about 1.9 to 2.2, an organic peroxide curing agent and at least 0.1 percent by weight based on the weight of the organopolysiloxane polymer of a metal stannate, where the metal is selected from the class consisting of rare earth metals and Groups II and VIII of the Periodic Table.

2. The composition of claim 1 wherein the composition contains from 0.1 to 10 percent by weight of said metal stannate.

3. The composition of claim 1 which includes an antistructuring agent selected from the group consisting of water, hydroxyl-terminated silanes and siloxanes, methyl endblocked polysiloxane fluids, alkoxylated organopolysiloxanes, phosphate fluids, glycols, esters and anhydrides thereof in an amount of from about 2 to 30 percent by weight on the weight of the organopolysiloxane polymer.

4. The composition of claim 1 wherein the organopolysiloxane polymer contains methyl vinyl groups.

5. The composition of claim 1 wherein the stannate is a Group II metal stannate.

6. The composition of claim 1 wherein the stannate is a Group VIII metal stannate.

7. The composition of claim 1 wherein the stannate is a rare earth stannate.

8. The heat cured organopolysiloxane elastomer of claim 1 in which the organopolysiloxane elastomer is obtained from an organopolysiloxane polymer having recurring structural units of the general formula $$R_n SiO_{\frac{4-n}{2}}$$

where R is selected from the group consisting of monovalent hydrocarbon radicals, halogenated monovalent hydrocarbon radicals and cyano-substituted aryl radicals, $n$ is a number of from about 1.9 to 2.2 and at least 0.1 percent by weight based on the weight of the organopolysiloxane polymer of a metal stannate where the metal is selected from the class consisting of rare earth metals and Groups II and VIII of the Periodic Table.

9. The elastomer of claim 8 wherein the organopolysiloxane polymer is a methylvinylsiloxane.

10. The composition of claim 1 wherein the metal stannate is cerium stannate.

11. The composition of claim 1 wherein the metal stannate is barium stannate.

12. The composition of claim 1 which includes a filler material in an amount of from about 10 to 300 percent by weight based on the weight of the organopolysiloxane polymer.

References Cited
UNITED STATES PATENTS

| | | | |
|---|---|---|---|
| 3,142,655 | 7/1964 | Bobear | 260—37 SB |
| 3,647,741 | 3/1972 | Hutchinson | 260—37 |

DONALD E. CZAJA, Primary Examiner

M. I. MARQUIS, Assistant Examiner

U.S. Cl. X.R.

260—45.75 K, 46.5 G